No. 735,697. PATENTED AUG. 11, 1903.
W. L. BEEBE & T. A. McFARLAND.
SKETCHING CAMERA.
APPLICATION FILED NOV. 22, 1902.
NO MODEL. 2 SHEETS—SHEET 2.

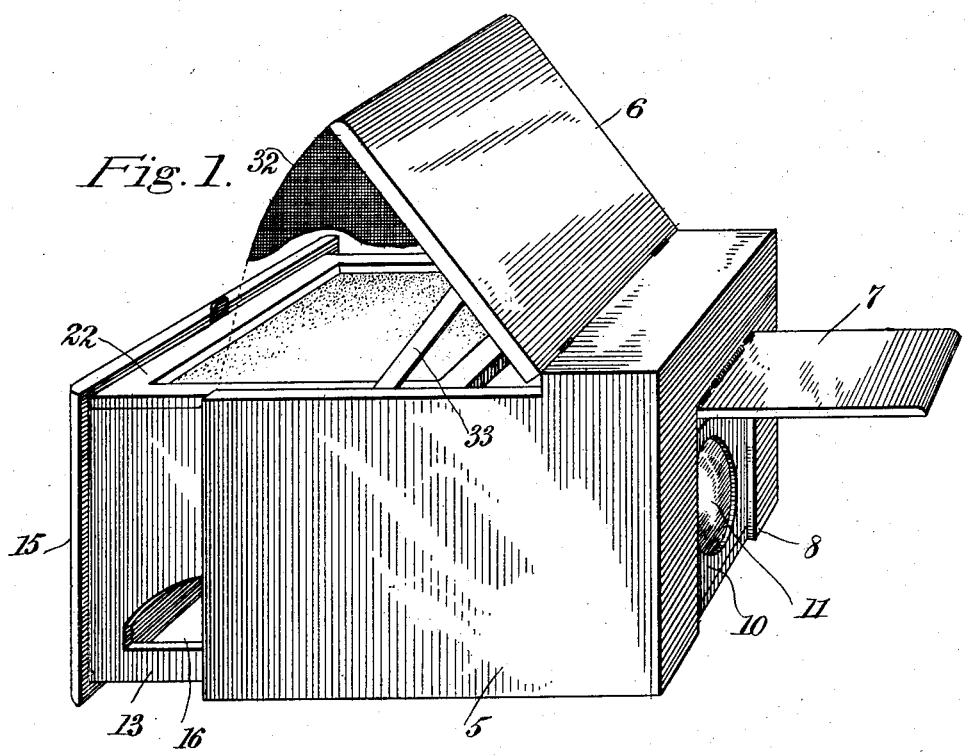
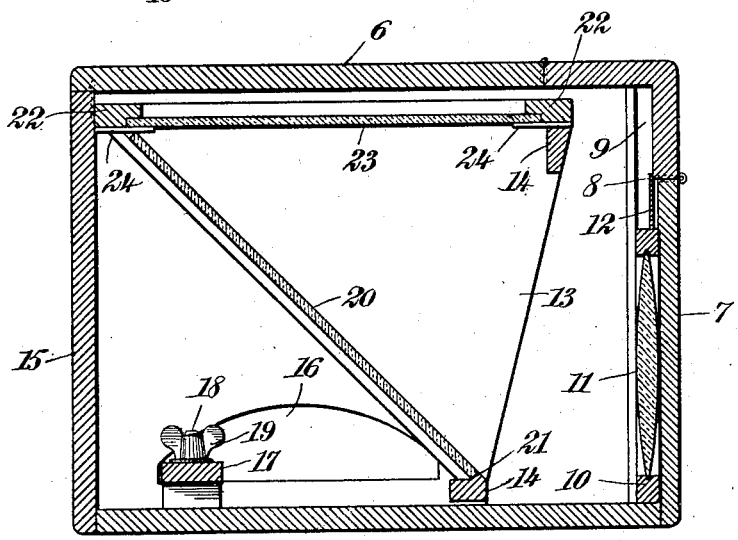

WITNESSES:
Robert Head

INVENTORS
William L. Beebe
Thomas A. McFarland
BY
ATTORNEYS.

No. 735,697. Patented August 11, 1903.

UNITED STATES PATENT OFFICE.

WILLIAM L. BEEBE AND THOMAS A. McFARLAND, OF CHICAGO, ILLINOIS.

SKETCHING-CAMERA.

SPECIFICATION forming part of Letters Patent No. 735,697, dated August 11, 1903.

Application filed November 22, 1902. Serial No. 132,389. (No model.)

*To all whom it may concern:*

Be it known that we, WILLIAM L. BEEBE and THOMAS A. MCFARLAND, both citizens of the United States, and residents of Chicago, in the county of Cook and State of Illinois, have invented a new and Improved Sketching-Camera, of which the following is a full, clear, and exact description.

Our invention relates to improvements in sketching-cameras, or, as it may be termed, a "mirrorscope," and one object that we have in view is to provide a simple portable apparatus especially adapted for fieldwork by artists, amateurs, and others in making sketches from nature or objects in general, the use of the instrument facilitating the selection of the view, composition and picturesqueness of the scene, and also serving as a color-guide.

A further object is to equip the instrument with means which enable it to be used advantageously in enlarging the sketch, which was prepared in the first instance with the aid afforded by the instrument.

Further objects and advantages of the invention will appear in the course of the subjoined description, and the novelty will be defined by the annexed claims.

Reference is to be had to the accompanying drawings, forming a part of this specification, in which similar characters of reference indicate corresponding parts in all the figures.

Figure 3:
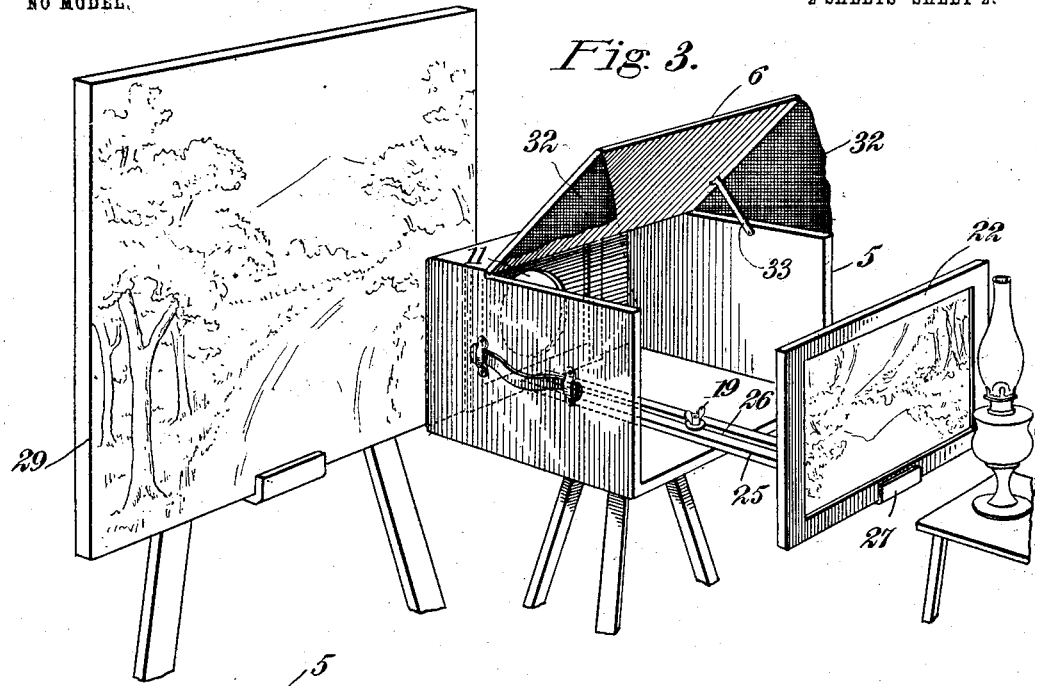
Figure 4:
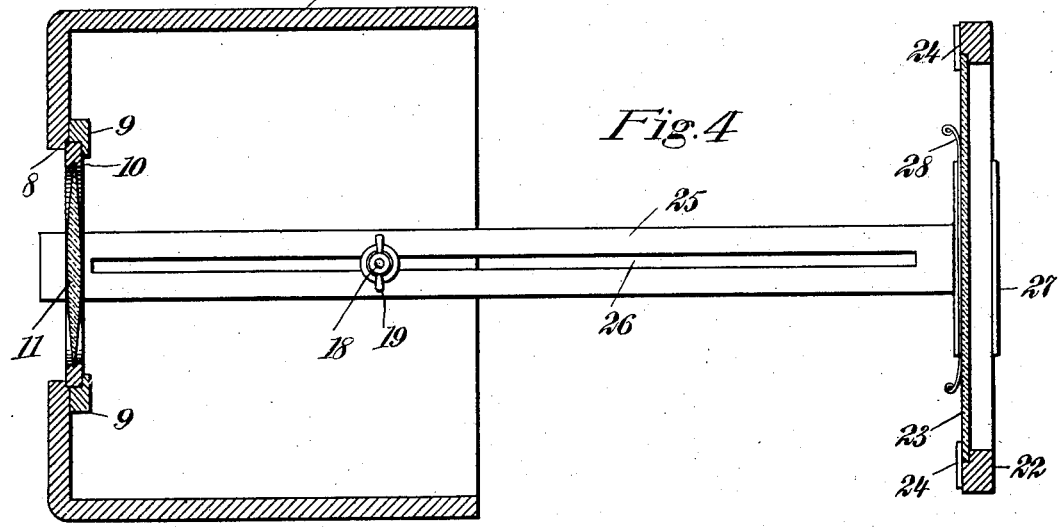
Figure 5:

Figure 1 is a perspective view of our improved sketching-camera, showing the parts adjusted for service. Fig. 2 is a vertical longitudinal section through the camera with its parts in their closed positions. Fig. 3 is a perspective view of the camera equipped with means whereby a sketch may be enlarged for the use of an artist in making a picture. Fig. 4 is a horizontal sectional plan view through the camera adjusted as shown by Fig. 3, and Fig. 5 is a detail perspective view of the attachments adapted for use in connection with the camera and a sketch when the article is used for enlarging purposes.

5 designates the casing of the improved camera, the same being provided with a hinged top 6 and a hinged door 7 in the front thereof. The door when closed is adapted to conceal a viewing-opening 8, which is provided in the front of the casing, and in rear of this opening the casing is provided with vertical guideways 9, the latter being situated on opposite sides of the opening. The door when open serves to shade the lens from sunlight. A frame 10, carrying an objective or lens 11, is fitted in the guideways of the casing to normally remain in a stationary lowered position therein; but this lens-frame and the objective are adapted to be raised a limited distance and to be sustained in said raised position when the camera is used for the purpose of enlarging a sketch, as will hereinafter appear. The depth of the viewing-opening 8 exceeds that of the lens-frame, and in order to close the casing against the admission of light when the lens-frame is in its normal lowered position we provide a shield 12 on the upper edge of the lens-frame, said shield extending upwardly from the frame 10 and above the lower edge of the opening 8, thus closing the camera against the admission of light, except the rays admitted by the objective 11. We prefer to employ a double-convex lens having a focus of proper length; but this focus should not be too short, and the lens should be of comparatively large diameter in order to admit a relatively large volume of light-rays into the camera.

The cover 6 and the door 7 may be hinged or pivotally attached to the camera-casing in any suitable way, and any suitable holding devices may be employed to maintain these parts in their opened positions. The cover 6 is adapted to close a large opening which is provided in the top of the camera-casing; but when the door is raised to the inclined position shown by Fig. 1 it is adapted to partially overhang the surface on which a sketch is to be made by the artist, thus serving as a hood or shield in preventing the light from falling directly upon the sketching-surface.

The rear side of the camera-casing is open, and in the casing is slidably fitted a frame which is adapted to carry a mirror, a sketching-surface, and a back to the casing. This frame consists of the side pieces 13, which are united at their corners by suitable cross-bars 14, thus presenting a strong light construction which is arranged to fit snugly between the sides of the casing. To the rear end of this skeleton frame is firmly secured the solid back 15 of the casing, said back being arranged to close tightly against the rear edges of the casing and to coöperate with the cover 6 in closing the casing compactly when it is desired to carry the camera by hand. The frame is slidably fitted in the casing below the cover in order that it may be moved toward or from the objective 11, and any suitable means may be employed to hold the frame slidably and removably within the casing. We prefer to provide the parallel sides 13 of the frame with longitudinal slots, (indicated at 16 in Fig. 2,) and in these slots are fitted the end portions of a horizontal guide-bar 17, the latter being arranged crosswise in the casing and secured removably therein by means of a bolt 18, which is equipped with a winged thumb-nut 19. The cross-bar 17 is secured to the bottom of the casing a suitable distance in front of the back 15 when the frame and the back are closed, as shown by Fig. 2, and the end portions of this cross-bar are received in the slots 16 to ride upon the lower edges of said slots, and thereby guide the frame slidably within the casing. It is evident, however, that the thumb-nut may be unscrewed from the bolt and that the cross-bar may be removed from the bolt and from the casing, thus permitting the frame and the back to be disconnected from the apparatus. The slidable frame is adapted to carry a mirror 20 and a sketching-surface. This mirror is arranged in an inclined position across the frame and relatively to the axis of the lens 11. The mirror may be fitted in the slidable frame in a way to easily remove and place it in position; but, as shown by Fig. 2, the lower edge of the mirror is arranged to rest on a seat 21, which is provided on the lower cross-bar 14 of the frame. Said mirror is sustained in its inclined position within the frame by suitable cleats or guides which are fastened to the sides, and in practice the mirror can be easily lifted out of the frame, and thereby removed from the camera in order to obtain access to the bar 17 and the thumb-nut 18.
The upper part of the frame is spaced with relation to the top part of the casing sufficiently to accommodate a frame 22, the latter resting directly upon the slidable frame and adjustable therewith. This frame 22 is rabbeted on its inner edges in order to accommodate a glass pane 23, which may be held in position removably within the frame by suitable fasteners 24, which are attached to opposite side rails of the frame and are adjustable in overlapping relation to the pane 23. We may employ a ground glass 23 to serve as a screen on which the image is reflected from the mirror 20; but in lieu of this ground-glass screen the operator may use a pane of plain glass covered by tracing or other transparent paper, the latter being clamped between the plain glass and the frame, so as to be held in a taut or stretched condition suitable for the operator to draw a picture on the transparent layer of material.

It will be observed that the pane 23 is supported by the slidable frame directly over the mirror 20 or in overhanging relation thereto, and the rays of light entering the lens 11 will be reflected by the mirror 20 onto the pane 23. When the cover 6 is opened, the frame 22 and its pane 23 may be inserted or removed into and from the slidable frame which carries the mirror, and when this frame 22 is in position it is adjustable with the frame and the mirror in order to secure the proper focus through the lens.

In using our camera for the purpose of enlarging the sketch which is initially prepared by the aid of the instrument we disconnect the cross-bar 17, the slidable frame, the mirror, and the glass 23 from the casing 5. The removal of the slidable frame and back, with the contained parts, is effected by lifting out the frame 22 and the mirror 20 to obtain access to the nut and the guide-bar, after which the frame can be withdrawn. The means for enlarging the sketch and the operative relation of the enlarging means to the camera are shown more clearly by Figs. 3, 4, and 5 of the drawings.

25 designates a carrying-bar which is adjustably attached to the casing 5 of the camera. This carrying-bar is provided with a longitudinal slot 26, adapted to receive the vertical bolt 18, which is fixed in the bottom of the casing, and on the bar is adapted to impinge the thumb-nut 19, thus making provision for fastening the bar securely to the casing at any desired point of adjustment. The rear end of the bar is provided with a cross-head 27, which is rigidly fastened to said bar and is arranged in a position at right angles thereto. Said cross-head consists of a bottom plate and a back plate arranged at right angles to each other, and this bottom plate of the cross-head serves as a rest on which the sketch may be supported, while the back plate of said cross-head is adapted to coöperate with the clamp in holding the sketch steadily in place on the rear end of the carrying-bar. In Figs. 4 and 5 of the drawings we have shown the clamp in the form of a spring 28, which is secured at its middle to the rear extremity of the bar 25 and has its end portions arranged to impinge the back plate of the cross-head. The frame 22, with the pane 23 therein, may easily be slipped into position on the cross-head to rest on the bottom plate and against the back plate, and this pane and frame are securely clamped in place by the spring pressing against the plate, as shown by Fig. 4.

The carrying-bar 25 is made long enough to extend entirely through the casing, and when this bar is used in connection with the camera for the purpose of enlarging the sketch the lens-frame and lens should be raised with relation to the bottom of the casing and to the viewing-opening 8 thereof in order that the image may be projected properly against a sketching-frame 29. To support the lens-frame in the raised position, we employ a strip or block 30, which is placed within the casing below the lens-frame, the latter resting upon said block. The block is provided in its lower edge with a notch or recess 31, as shown by Fig. 5, and through this notch is adapted to pass the extreme front end of the slotted carrying-bar 25.

In using the camera to enlarge a sketch the frame and the back are removed, after which the lens-frame is elevated by placing the block 30 below the frame and within the casing. The slotted bar 25 is now placed on the bottom of the casing for its front end to fit into the notch 31 of the block, and the bar is clamped at the desired point of adjustment by the nut 19. The frame 22, with the sketch thereon, is fitted in the cross-head and held by the spring 28. A strong light of any suitable character is placed back of the sketch, as shown by Fig. 3, and the image is projected onto the sketching-frame 29 by the objective or lens 11.

From the foregoing description it will be understood that our improved camera is of simple compact construction in order that the several parts thereof may be folded compactly, as represented by Fig. 2, for the purpose of adapting the instrument to fieldwork. The camera may be carried by hand with the same ease and convenience as ordinary photographic cameras, and it is adapted to be mounted on a tripod or any other surface in order that it may remain steadily in place during the operation of preparing the sketch.

The attachments for enlarging the sketch may be used to advantage in connection with certain parts of the camera in indoor-work.

As shown by Figs. 1 and 3, the cover 6 may be equipped with pliable side curtains 32, arranged to depend from said cover when it is held in a raised position—as, for example, by the foldable prop 33—said curtains being adapted to shield the sketching-surface from the light-rays admitted at the sides of the cover.

Having thus described our invention, we claim as new and desire to secure by Letters Patent—

1. A sketching-camera comprising a casing having an objective, a frame slidably fitted within said casing, and adjustable toward or from the objective, an inclined mirror carried by said slidable frame, and a sketching-surface mounted on said slidable frame in the path of light-rays reflected from the mirror.

2. A sketching-camera comprising a suitable casing having a lens, a frame slidably fitted within said casing, a mirror mounted in said slidable frame, and a sketching-surface supported by the frame in overhanging relation to the mirror, said mirror and the sketching-surface being adjustable with the frame relatively to the lens.

3. A sketching-camera comprising a suitable casing having a lens, a frame slidably fitted within said casing, guiding devices secured to the casing and having operative relation to the frame to limit the slidable movement thereof within the casing, a mirror fitted removably to the frame, and a sketching-surface carried by said frame in the path of an image adapted to be projected from the mirror.

4. A sketching-camera comprising a casing having an objective, a frame slidably fitted within said casing, a mirror carried by the frame, and a sketching-frame fitted removably to the slidable frame and disposed over the mirror, said sketching-frame adapted to carry a glass or other sketching-surface.

5. A sketching-camera comprising a suitable casing having a lens, a frame slidably fitted within the casing and provided with guide-slots, a cross-bar removably clamped within the casing and engaging with the slotted parts of the slidable frame, a mirror mounted in the slidable frame, and a sketching-frame fitted removably to the slidable frame.

6. A sketching-camera comprising a casing, a lens-frame fitted to said casing for vertical adjustment therein, a carrying-bar clamped adjustably to the casing, and a cross-head supported by the carrying-bar and adjustable therewith toward or from the lens.

7. A sketching-camera comprising a casing having a removable back section, a lens in said casing, a carrying-bar clamped adjustably to the casing and extending rearwardly therefrom, and a sketch-support mounted on said carrying-bar and adjustable therewith relatively to the lens, said sketch-support being held by the carrying-bar in rear of an open end of the casing and in the path of an image projected by the lens.

8. A sketching-camera comprising a casing having a lens, a carrying-bar clamped adjustably to the casing, a cross-head fixed to the carrying-bar, and a clamp supported by the carrying-bar and coöperating with the cross-head to maintain a sketch in fixed position on said carrying-bar.

9. A sketching-camera comprising a casing having a vertical guideway, a lens-frame slidably fitted in said guideway, a supporting-block adapted to be placed below the lens-frame, and a sketch-carrying bar clamped adjustably to the casing and adapted to slide through said supporting-block.

In testimony whereof we have signed our names to this specification in the presence of two subscribing witnesses.

WILLIAM L. BEEBE.
THOMAS A. McFARLAND.

Witnesses:
WILLIAM McINERNEY,
HARRY H. DIEDRICH.